US012049090B2

(12) United States Patent
Kato et al.

(10) Patent No.: US 12,049,090 B2
(45) Date of Patent: Jul. 30, 2024

(54) THERMAL HEAD AND THERMAL PRINTER

(71) Applicant: KYOCERA CORPORATION, Kyoto (JP)

(72) Inventors: Kenichi Kato, Kirishima (JP); Makoto Miyamoto, Kirishima (JP)

(73) Assignee: KYOCERA CORPORATION, Kyoto (JP)

(*) Notice: Subject to any disclaimer, the term of this patent is extended or adjusted under 35 U.S.C. 154(b) by 27 days.

(21) Appl. No.: 17/907,672

(22) PCT Filed: Mar. 26, 2021

(86) PCT No.: PCT/JP2021/012894
§ 371 (c)(1),
(2) Date: Sep. 29, 2022

(87) PCT Pub. No.: WO2021/200669
PCT Pub. Date: Oct. 7, 2021

(65) Prior Publication Data

US 2023/0126990 A1 Apr. 27, 2023

(30) Foreign Application Priority Data

Mar. 31, 2020 (JP) ................................ 2020-063694

(51) Int. Cl.
*B41J 2/335* (2006.01)
*B41J 2/345* (2006.01)

(52) U.S. Cl.
CPC ............... *B41J 2/345* (2013.01); *B41J 2/335* (2013.01); *B41J 2/33505* (2013.01); *B41J 2/3351* (2013.01); *B41J 2/33515* (2013.01); *B41J 2/3352* (2013.01); *B41J 2/33525* (2013.01); *B41J 2/3353* (2013.01); *B41J 2/3354* (2013.01);

(Continued)

(58) Field of Classification Search
CPC ........ B41J 2/345; B41J 2/335; B41J 2/33505; B41J 2/3351; B41J 2/33515; B41J 2/3352; B41J 2/33525; B41J 2/3353; B41J 2/3354; B41J 2/33545; B41J 2/3355; B41J 2/3357
See application file for complete search history.

(56) References Cited

U.S. PATENT DOCUMENTS 5,677,575 A * 10/1997 Maeta ............... H01L 23/49827 257/781
2017/0182794 A1* 6/2017 Nishimura ............. B41J 2/3351

FOREIGN PATENT DOCUMENTS

JP S60191346 U 12/1985
JP H09162230 A * 6/1997 ............ H01L 21/60
JP H11340281 A 12/1999

(Continued)

*Primary Examiner* — Yaovi M Ameh
(74) *Attorney, Agent, or Firm* — HAUPTMAN HAM, LLP

(57) ABSTRACT

A thermal head includes a substrate, an electrode, a bonding material, an electrically conductive member, and a sealing material. The electrode is located on the substrate. The bonding material is located on the substrate or the electrode. The electrically conductive member is located on the bonding material and is electrically connected to the electrode via the bonding material. The sealing material is located on the substrate and covers the bonding material and the electrically conductive member. The bonding material includes a protruding portion located at an outer circumferential edge of the electrically conductive member away from the substrate and the electrically conductive member.

7 Claims, 12 Drawing Sheets

(52) U.S. Cl.
CPC ......... *B41J 2/33545* (2013.01); *B41J 2/3355* (2013.01); *B41J 2/3357* (2013.01)

(56) References Cited

FOREIGN PATENT DOCUMENTS

| | | | |
|---|---|---|---|
| JP | 200022300 | A | 1/2000 |
| JP | 2000216530 | A | 8/2000 |
| JP | 2017114057 | A | 6/2017 |

* cited by examiner

THERMAL HEAD AND THERMAL PRINTER

CROSS-REFERENCE TO RELATED APPLICATION(S)

This application is a national stage application of International Application No. PCT/JP2021/012894, filed on Mar. 26, 2021, which designates the United States, and which is based upon and claims the benefit of priority to Japanese Patent Application No. 2020-063694, filed on Mar. 31, 2020.

TECHNICAL FIELD

Embodiments of this disclosure relate to a thermal head and a thermal printer.

BACKGROUND OF INVENTION

Various kinds of thermal heads for printing devices such as facsimile machines and video printers have been proposed in the related art.

A connection structure in which solder for fixing an electronic component to a substrate has a fillet shape has been proposed.

CITATION LIST

Patent Literature

Patent Literature 1: JP 2000-216530 A

SUMMARY

In an aspect of an embodiment, a thermal head includes a substrate, an electrode, a bonding material, an electrically conductive member, and a sealing material. The electrode is located on the substrate. The bonding material is located on the substrate or the electrode. The electrically conductive member is located on the bonding material and is electrically connected to the electrode via the bonding material. The sealing material is placed on the substrate and covers the bonding material and the electrically conductive member. The bonding material includes a protruding portion located at an outer circumferential edge of the electrically conductive member away from the substrate and the electrically conductive member.

In an aspect of an embodiment, a thermal printer includes the thermal head described above, a transport mechanism, and a platen roller. The transport mechanism transports a recording medium on a heat generating part located on the substrate. The platen roller presses the recording medium on the heat generating part.

DESCRIPTION OF EMBODIMENTS

Embodiments of a thermal head and a thermal printer disclosed in the present application will be described below with reference to the accompanying drawings. Note that this invention is not limited to each of the embodiments that will be described below.

Embodiments

Figure 1:
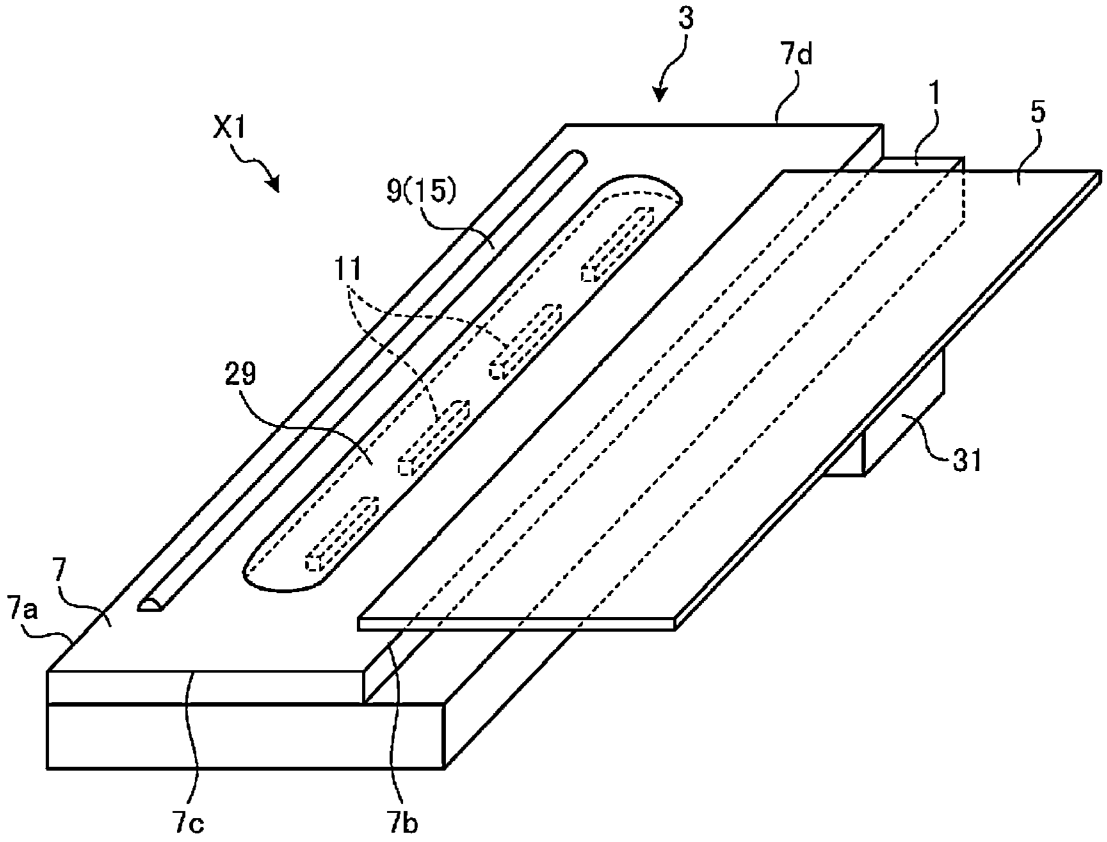
FIG. 1 is a perspective view schematically illustrating a thermal head according to an embodiment.

FIG. 1 is a perspective view schematically illustrating a thermal head according to an embodiment. In the embodiment, a thermal head X1 includes a heat dissipation body 1, a head base 3, and a flexible printed circuit board (FPC) 5 as illustrated in FIG. 1. The head base 3 is located on the heat dissipation body 1. The FPC 5 is electrically connected to the head base 3. The head base 3 includes a substrate 7, a heat generating part 9, a drive IC 11, and a covering member 29.

The heat dissipation body 1 has a plate-like shape and has a rectangular shape in plan view. The heat dissipation body 1 has a function of dissipating the heat generated by the heat generating part 9 of the head base 3, especially heat not contributing to printing. The head base 3 is bonded to an upper surface of the heat dissipation body 1 using a double-sided tape, an adhesive, or the like (not illustrated). The heat dissipation body 1 is made of, for example, a metal material such as copper, iron, or aluminum.

The head base 3 has a plate-like shape and has a rectangular shape in plan view. The head base 3 includes each member constituting the thermal head X1 located on the substrate 7. The head base 3 performs printing on a recording medium P (see FIG. 6) according to an electrical signal supplied from outside.

A plurality of drive ICs 11 are located on the substrate 7 and arranged in a main scanning direction. The drive ICs 11 are electronic components having a function of controlling a conductive state of the heat generating part 9. A switching member including a plurality of switching elements inside, for example, may be used for the drive ICs 11.

The drive IC 11 is covered by a covering member 29 made of a resin such as an epoxy resin or a silicone resin. The covering member 29 is located across the plurality of drive ICs 11. The covering member 29 is an example of a sealing material.

The FPC 5 is electrically connected to the head base 3 at one end and is electrically connected to a connector 31 at the other end.

Figure 2:
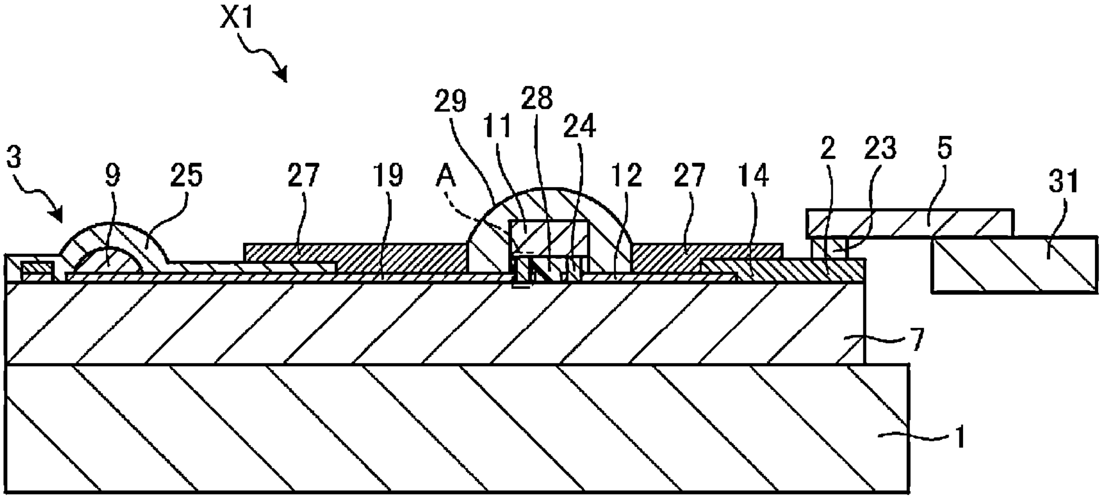
FIG. 2 is a cross-sectional view schematically illustrating the thermal head illustrated in FIG. 1.

The FPC 5 is electrically connected to the head base 3 using an electrically conductive bonding material 23 (see FIG. 2). An example of the electrically conductive bonding material 23 may include a solder material or an anisotropic conductive film (ACF) in which electrically conductive particles are mixed into an electrically insulating resin.

Figure 3:
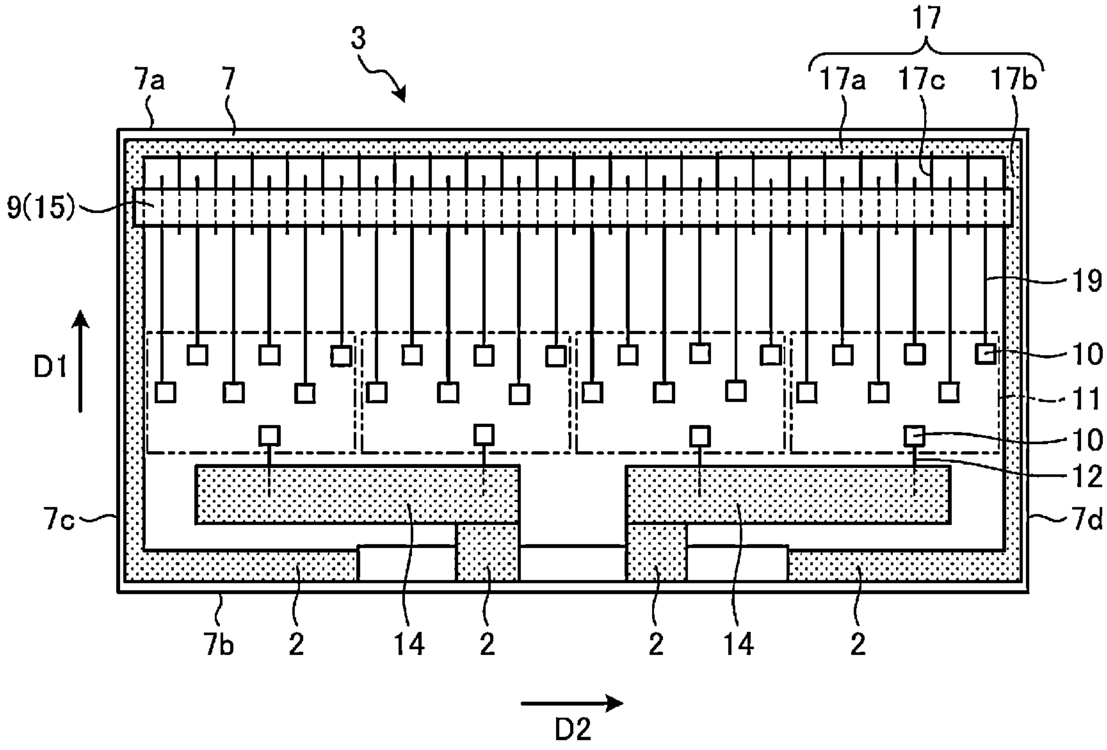
FIG. 3 is a plan view schematically illustrating a head base illustrated in FIG. 1.

Hereinafter, each of the members constituting the head base 3 will be described using FIGS. 1 to 3. FIG. 2 is a cross-sectional view schematically illustrating the thermal head illustrated in FIG. 1. FIG. 3 is a plan view schematically illustrating the head base illustrated in FIG. 1.

The head base 3 further includes the substrate 7, a common electrode 17, an individual electrode 19, a first electrode 12, a second electrode 14, a terminal 2, a heat generating resistor 15, a protective layer 25, a covering layer 27, a bonding material 24, and an underfill material 28. Note that, in FIG. 1, the protective layer 25 and the covering layer 27 are omitted. FIG. 3 illustrates wiring of the head base 3 in a simplified manner, in which the protective layer 25, the covering layer 27, and the underfill material 28 are omitted. In FIG. 3, a configuration of the second electrode 14 is illustrated in a simplified manner, and the alternate long and two short dashed lines indicate a schematic shape of the drive ICs 11 in plan view.

The substrate 7 has a rectangular shape in plan view. The substrate 7 has a first long side 7*a* that is one long side, a second long side 7*b* that is the other long side, a first short side 7*c*, and a second short side 7*d*. The substrate 7 is made of an electrically insulating material such as an alumina ceramic or a semiconductor material such as monocrystalline silicon.

The common electrode 17 is located on an upper surface of the substrate 7 as illustrated in FIG. 2. The common electrode 17 is made of an electrically conductive material, and examples thereof include at least one metal selected from aluminum, gold, silver, and copper, or an alloy of these metals.

The common electrode 17 includes a first common electrode 17*a*, a second common electrode 17*b*, a third common electrode 17*c*, and the terminal 2 as illustrated in FIG. 3. The common electrode 17 is electrically connected in common to the heat generating part 9 including a plurality of elements.

The first common electrode 17*a* is located between the first long side 7*a* of the substrate 7 and the heat generating part 9, and extends in the main scanning direction. The plurality of second common electrodes 17*b* are located respectively along the first short side 7*c* and the second short side 7*d* of the substrate 7. Each of the plurality of second common electrodes 17*b* connects the corresponding terminal 2 and the first common electrode 17*a*. Each of the third common electrodes 17*c* extends from the first common electrode 17*a* toward a corresponding element of the heat generating part 9, and a part of the third common electrode 17*c* extends through the heat generating part 9 to the side opposite to the heat generating part 9. The third common electrodes 17*c* are located at intervals in a second direction D2 (the main scanning direction).

The individual electrode 19 is located on the upper surface of the substrate 7. The individual electrode 19 contains a metal component and thus has electrical conductivity. The individual electrode 19 is made of, for example, a metal such as aluminum, nickel, gold, silver, platinum, palladium, or copper, and an alloy of these metals. The individual electrode 19 made of gold has a high electrical conductivity. A plurality of individual electrodes 19 are located in the main scanning direction and each of them is located between adjacent third common electrodes 17*c*. As a result, in the thermal head X1, the third common electrodes 17*c* and the plurality of individual electrodes 19 are alternately arranged in the main scanning direction. Each individual electrode 19 is connected to an electrode pad 10 at a portion close to the second long side 7*b* of the substrate 7. The electrode pad 10 is electrically connected to the drive ICs 11 via the bonding material 24 (see FIG. 2). The electrode pad 10 may be made of the same material as the individual electrode 19, for example.

The first electrode 12 is connected to the electrode pad 10, and extends in a first direction D1 (a sub-scanning direction). The drive IC 11 is mounted on the electrode pad 10 as described above. The electrode pad 10 may be made of the same material as the first electrode 12, for example.

The second electrode 14 extends in the main scanning direction and is located over a plurality of first electrodes 12. The second electrode 14 is connected to the outside via the terminal 2.

The terminal 2 is located on the second long side 7*b* side of the substrate 7. The terminal 2 is connected to the FPC 5 via the electrically conductive bonding material 23 (see FIG. 2). In this way, the head base 3 is electrically connected to the outside.

The above-described third common electrode 17*c*, the individual electrode 19, and the first electrode 12 can be made by forming a material layer constituting each of the electrodes on the substrate 7 using, for example, a screen printing method, a flexographic printing method, a gravure printing method, a gravure offset printing method, or the like. The above-described electrodes may be formed, for example, by sequentially layering the electrodes using a known thin film forming technique such as a sputtering method, and then processing the layered body into a predetermined pattern by using known photoetching, or the like. A thickness of each of the third common electrode 17*c*, the individual electrode 19, and the first electrode 12 is, for example, approximately from 0.3 to 10 μm, and may be, for example, approximately from 0.5 to 5 μm.

The above-described first common electrode 17*a*, the second common electrode 17*b*, the second electrode 14, and the terminal 2 can be made by forming a material layer constituting each of the electrodes on the substrate 7 using, for example, a screen printing method. A thickness of each of the first common electrode 17*a*, the second common electrode 17*b*, the second electrode 14, and the terminal 2 is, for example, approximately from 5 to 20 μm. By forming the thick electrode in this manner, the wiring resistance of the head base 3 can be reduced. Note that the portion of the thick electrode is illustrated by dots in FIG. 3, and this also applies to the following drawings.

The heat generating resistor 15 is located across the third common electrode 17*c* and the individual electrode 19 and spaced apart from the first long side 7*a* of the substrate 7. A portion of the heat generating resistor 15 located between the third common electrode 17*c* and the individual electrode 19 functions as each element of the heat generating part 9. Although each element of the heat generating part 9 is illustrated in a simplified manner in FIG. 3, the elements are located at a density from, for example, 100 dpi to 2400 dpi (dot per inch) or the like.

The heat generating resistor 15 may be formed, for example, by placing a material paste containing ruthenium oxide as a conductive component on the substrate 7 including the patterned various electrodes in a long strip-like shape elongated in the main scanning direction using a screen printing method or a dispensing device.

The protective layer 25 is located on the heat storage layer 13 formed on the upper surface of the substrate 7 to cover the heat generating part 9. The protective layer 25 is located extending from the first long side 7*a* of the substrate 7 but separated from the electrode pad 10 and extending in the main scanning direction of the substrate 7.

The protective layer 25 has an insulating property and protects the covered region from corrosion due to deposition of moisture and the like contained in the atmosphere, or from wear due to contact with the recording medium to be printed. The protective layer 25 can be made of, for example, glass using a thick film forming technique such as printing.

The protective layer 25 may be formed using SiN, $SiO_2$, SiON, SiC, diamond-like carbon, or the like. Note that the protective layer 25 may be a single layer or be formed by layering a plurality of protective layers 25. The protective layer 25 such as that described above can be formed using a thin film forming technique such as a sputtering method.

The covering layer 27 is located on the substrate 7 such that the covering layer partially covers the common electrode 17, the individual electrode 19, the first electrode 12, and the second electrode 14. The covering layer 27 protects the covered region from oxidation due to contact with the atmosphere or from corrosion due to deposition of moisture and the like contained in the atmosphere. The covering layer 27 can be made of a resin material such as an epoxy resin, a polyimide resin, or a silicone resin.

The bonding material 24 is located on the substrate 7, and electrically connects the drive IC 11 and the individual electrode 19. The bonding material 24 has electrical conductivity. The bonding material 24 may contain, for example, gold (Au) and tin (Sn). The bonding material 24 may contain a glass component. Note that bonding of the drive ICs 11 by the bonding material 24 will be described in detail later.

The underfill material 28 is located between the substrate 7 and the drive ICs 11, and covers a part of the bonding material 24 and the drive ICs 11. The underfill material 28 has insulating properties. The underfill material 28 can be made of, for example, a resin such as an epoxy resin. The underfill material 28 is an example of a sealing material.

Note that, although the substrate 7 has been described as a single layer, the substrate may have a layered structure in which the heat storage layer is located on the upper surface thereof. The heat storage layer can be located over the entire region on the upper surface side of the substrate 7. The heat storage layer is made of glass having low thermal conductivity, for example. The heat storage layer temporarily stores part of the heat generated by the heat generating part 9, and thus the time required to increase the temperature of the heat generating part 9 can be shortened. This functions to enhance the thermal response properties of the thermal head X1.

The heat storage layer is made by, for example, applying a predetermined glass paste obtained by mixing glass powder with an appropriate organic solvent onto the upper surface of the substrate 7 using a known screen printing method or the like, and firing the upper surface.

Note that the heat storage layer may include an underlying portion and a raised portion. In this case, the underlying portion is located across the entire region on the upper surface side of the substrate 7. The raised portion protrudes from the underlying portion in the thickness direction of the substrate 7, and extends in a strip shape in the second direction D2 (the main scanning direction). In this case, the raised portion functions to favorably press the recording medium to be printed against the protective layer 25 formed on the heat generating part 9. Note that the heat storage layer may include only the raised portion.

Figure 4:
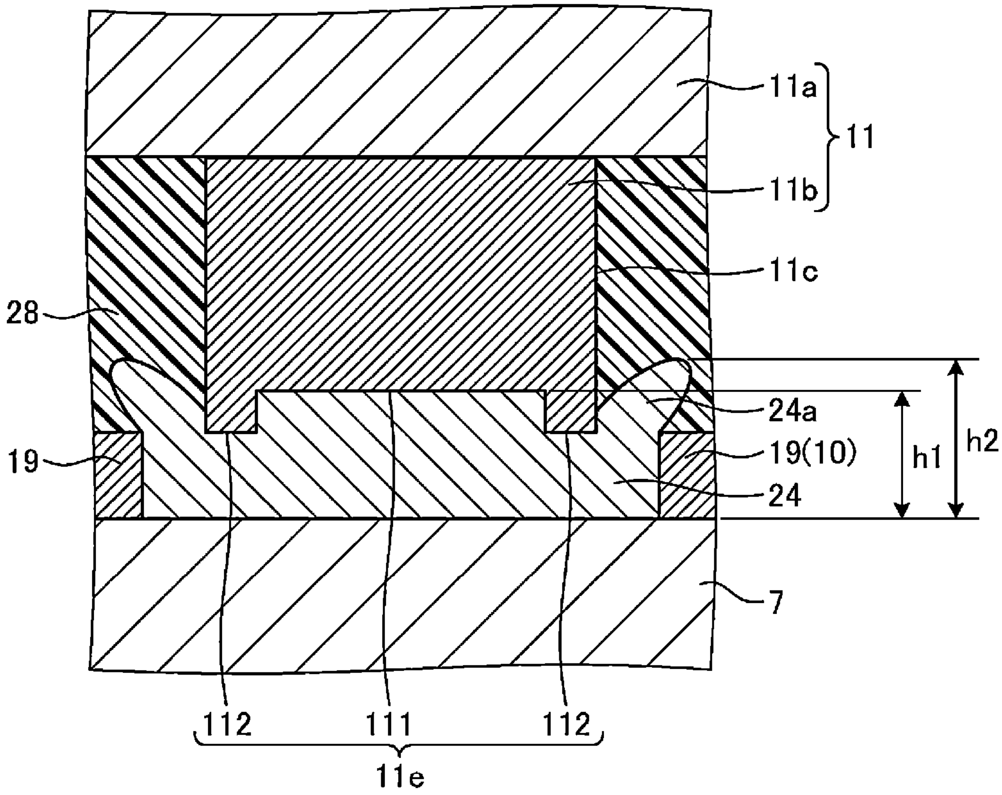
FIG. 4 is an enlarged cross-sectional view of a region A illustrated in FIG. 2.

The main portion of the thermal head X1 according to an embodiment will be described in detail using FIG. 4. FIG. 4 is an enlarged cross-sectional view of a region A illustrated in FIG. 2.

The drive IC 11 includes an element portion 11*a* and a terminal portion 11*b* as illustrated in FIG. 4. The element portion 11*a* is a main portion that achieves the above-described functions of the drive IC 11. The terminal portion 11*b* is electrically connected to the element portion 11*a*. The terminal portion 11*b* has an end surface 11*e* facing the substrate 7. In other words, the end surface 11*e* is a surface of 11*b* of the terminal portion on the substrate 7 side.

The terminal portion 11*b* is electrically connected to the electrode pad 10 located at an end portion of the individual electrode 19 via the bonding material 24 located on the substrate 7. The terminal portion 11*b* is, for example, an electrically conductive metal member. The terminal portion 11*b* contains, for example, copper and nickel. The terminal portion 11*b* is an example of an electrically conductive member.

The bonding material 24 is located between the substrate 7 and the terminal portion 11*b* of the drive IC 11, and fixes the drive IC 11 onto the substrate 7.

The bonding material 24 is located on the substrate 7, and is in contact with and adjacent to the individual electrode 19. For this reason, the drive IC 11 and the individual electrode 19 are electrically connected via the bonding material 24.

The bonding material 24 includes a protruding portion 24*a* located at an outer circumferential edge of the terminal portion 11*b*. The protruding portion 24*a* is located away from the substrate 7 and the terminal portion 11*b*. Since the bonding material 24 includes the protruding portion 24*a* as described above, durability is increased. This point will be described in comparison of FIGS. 4 and 5.

Figure 5A:
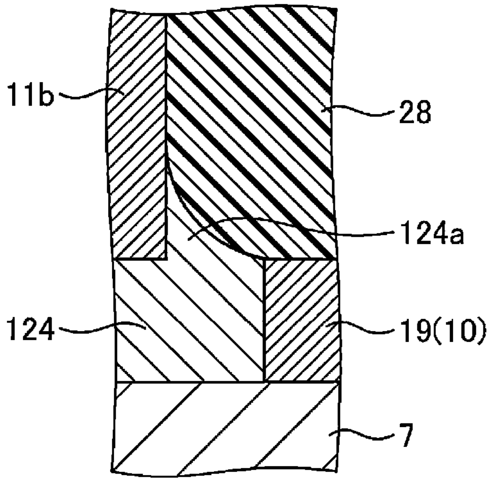
FIG. 5A is a partial cross-sectional view for comparing shapes of a bonding material.
Figure 5B:
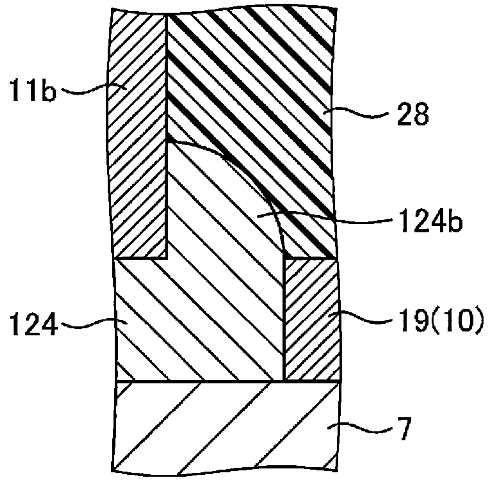
FIG. 5B is a partial cross-sectional view for comparing shapes of the bonding material.

FIGS. 5A and 5B are partial cross-sectional views to compare shapes of the bonding material. In the examples illustrated in FIGS. 5A and 5B, the terminal portion 11*b* and the individual electrode 19 are electrically connected using a bonding material 124, instead of the bonding material 24 illustrated in FIG. 4.

In the example illustrated in FIG. 5A, the bonding material 124 includes a fillet portion 124*a* located at an outer circumferential edge of the terminal portion 11*b*. In the example illustrated in FIG. 5B, the bonding material 124 includes a raised portion 124*b* located at an outer circumferential edge of the terminal portion 11*b*.

In both FIG. 5A and FIG. 5B, the contact area between the underfill material 28 and the terminal portion 11*b* and the bonding material 124 is smaller than a case where the fillet portion 124*a* and the raised portion 124*b* are not included. In contrast, since the protruding portion 24*a* of the bonding material 24 is located away from the substrate 7 and the terminal portion 11*b* as illustrated in FIG. 4, the contact area between the underfill material 28 and the terminal portion 11*b* and the bonding material 24 is larger than when the protruding portion 24*a* is not included. For this reason, peeling or breakage of the underfill material 28 is less likely to occur. As a result, in the embodiment, the thermal head X1 has improved durability.

The end surface 11*e* of the terminal portion 11*b* facing the bonding material 24 may include a first end surface 111 and a second end surface 112 as illustrated in FIG. 4. The second end surface 112 is located closer to the substrate 7 than the first end surface 111, and surrounds the first end surface 111 in plan view. The first end surface 111 and the second end surface 112 are included in this manner, and thus the contact area between the terminal portion 11*b* and the bonding material 24 increases. Therefore, the terminal portion 11*b* is less likely to detach from the bonding material 24. As a result, in the embodiment, the thermal head X1 has improved durability.

The end portion of the protruding portion 24*a* may be located farther from the substrate 7 than the first end surface 111. Specifically, a dimension h2 from the substrate 7 to the end portion of the protruding portion 24*a* may be greater than a dimension h1 from the substrate 7 to the first end surface 111 as illustrated in FIG. 4. The contact area between the underfill material 28 and the bonding material 24 is increased by locating the protruding portion 24*a* in this manner. Therefore, peeling of the underfill material 28 from the bonding material 24 is less likely to occur. As a result, in the embodiment, the thermal head X1 has improved durability.

The underfill material 28 has a portion located between the protruding portion 24*a* and the terminal portion 11*b*. In other words, a part of the underfill material 28 enters between the protruding portion 24*a* and the terminal portion 11*b*. With such a configuration, the contact area between the underfill material 28 and the bonding material 24 is further increased. Therefore, peeling of the underfill material 28 from the bonding material 24 is even less likely to occur.

Note that, although not illustrated, the connection of the drive IC 11 to the electrode pad 10 located at the first electrodes 12 can also be the same as and/or similar to the connection of the drive IC 11 to the electrode pad 10 located the end portions of the individual electrode 19 described above.

Figure 6:
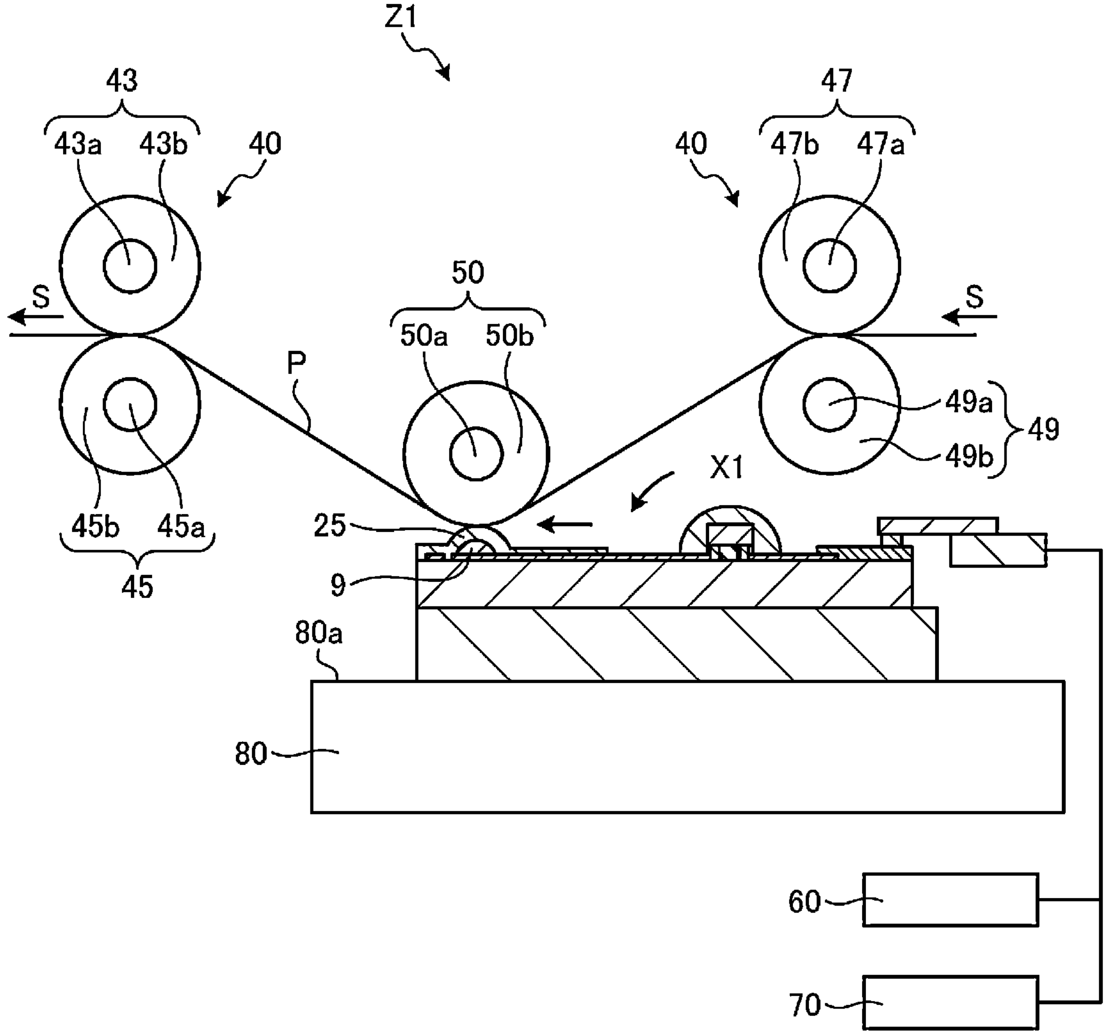
FIG. 6 is a schematic view of a thermal printer according to an embodiment.

A thermal printer Z1 with the thermal head X1 will be described with reference to FIG. 6. FIG. 6 is a schematic view of a thermal printer according to an embodiment.

In the present embodiment, the thermal printer Z1 includes the above-described thermal head X1, a transport mechanism 40, a platen roller 50, a power supply device 60, and a control device 70. The thermal head X1 is attached to a mounting surface 80*a* of a mounting member 80 disposed in a housing (not illustrated) of the thermal printer Z1. Note that the thermal head X1 is attached to the mounting member 80 such that the thermal head is aligned in the main scanning direction orthogonal to a transport direction S.

The transport mechanism 40 includes a drive unit (not illustrated) and transport rollers 43, 45, 47, and 49. The transport mechanism 40 transports a recording medium P, such as heat-sensitive paper or image-receiving paper to which ink is to be transferred, on the protective layer 25 located on a plurality of heat generating parts 9 of the thermal head X1 in the transport direction S indicated by an arrow. The drive unit has a function of driving the transport rollers 43, 45, 47, and 49, and a motor can be used for the drive unit, for example. The transport rollers 43, 45, 47, and 49 may be configured by, for example, covering cylindrical shaft bodies 43*a*, 45*a*, 47*a*, and 49*a* made of a metal such as stainless steel, with elastic members 43*b*, 45*b*, 47*b*, and 49*b* made of butadiene rubber or the like. Note that, if the recording medium P is an image-receiving paper or the like to which ink is to be transferred, an ink film (not illustrated) is transported between the recording medium P and the heat generating part 9 of the thermal head X1 together with the recording medium P.

The platen roller 50 has a function of pressing the recording medium P onto the protective layer 25 located on the heat generating part 9 of the thermal head X1. The platen roller 50 is disposed extending in a direction orthogonal to the transport direction S, and both end portions thereof are supported and fixed such that the platen roller 50 is rotatable while pressing the recording medium P onto the heat generating part 9. The platen roller 50 includes a cylindrical shaft body 50*a* made of a metal such as stainless steel and an elastic member 50*b* made of butadiene rubber or the like. The shaft body 50*a* is covered with the elastic member 50*b*.

As described above, the power supply device 60 has a function of supplying a current for causing the heat generating part 9 of the thermal head X1 to generate heat and a current for operating the drive IC 11. The control device 70 has a function of supplying a control signal for controlling operation of the drive IC 11, to the drive IC 11 in order to selectively cause the heat generating parts 9 of the thermal head X1 to generate heat as described above.

The thermal printer Z1 performs predetermined printing on the recording medium P by selectively causing the heat generating parts 9 to generate heat with the power supply device 60 and the control device 70, while the platen roller 50 presses the recording medium P onto the heat generating parts 9 of the thermal head X1 and the transport mechanism 40 transports the recording medium P on the heat generating parts 9. Note that, if the recording medium P is image-receiving paper or the like, printing is performed onto the recording medium P by thermally transferring, to the recording medium P, an ink of the ink film (not illustrated) transported together with the recording medium P.

Variations

Thermal heads X1 according to a first variation to a fifth variation of the embodiment will be described with reference to FIGS. 7 to 10.

Figure 7:
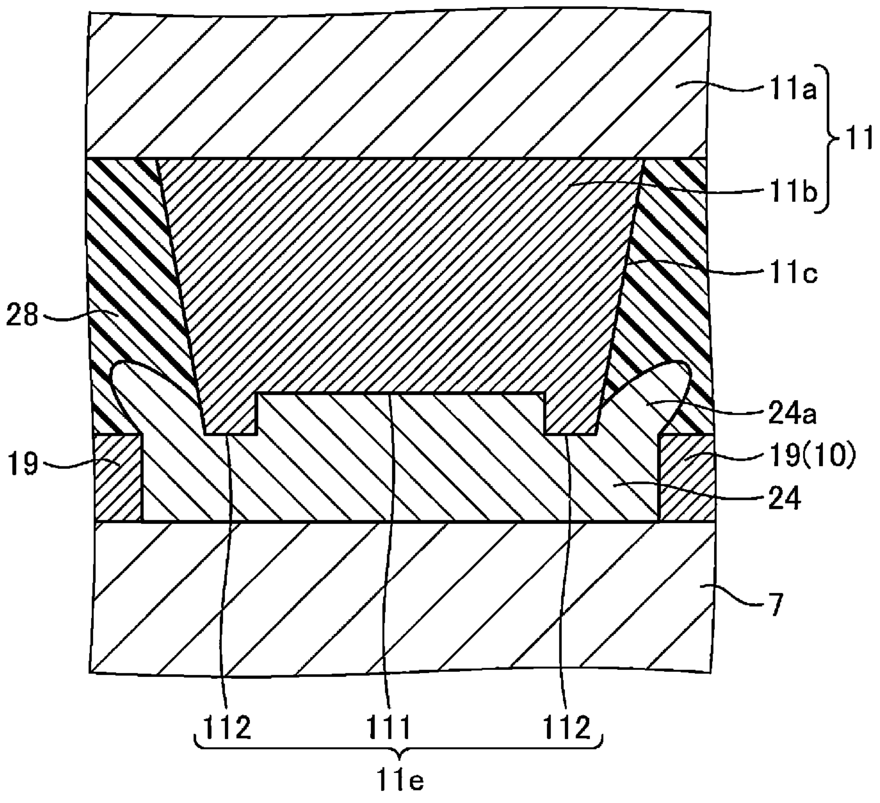
FIG. 7 is a cross-sectional view illustrating the main portion of a thermal head according to a first variation of the embodiment.

FIG. 7 is a cross-sectional view illustrating the main portion of the thermal head according to the first variation of the embodiment. An outer circumferential surface 11*c* is located such that the terminal portion 11*b* of the drive IC 11 has a constant cross-sectional area along the end surface 11*e* in the embodiment described above. In contrast, the outer circumferential surface 11*c* may be located such that the terminal portion 11*b* has a cross-sectional area along the end surface 11*e* that becomes smaller as the terminal portion 11*b* gets closer to the substrate 7 as illustrated in FIG. 7. The outer circumferential surface 11*c* of the terminal portion 11*b* is located in this manner, and thus the area of the end surface 11*e* becomes smaller, and pressure applied to the bonding material 24 by the end surface 11*e* increases. With this configuration, the overhang of the bonding material 24 (the protruding portion 24*a*) increases, and the contact area between the bonding material 24 and the underfill material 28 increases accordingly. Therefore, peeling of the underfill material 28 from the bonding material 24 is less likely to occur. As a result, the thermal head X1 according to the present variation has improved durability.

Figure 8:
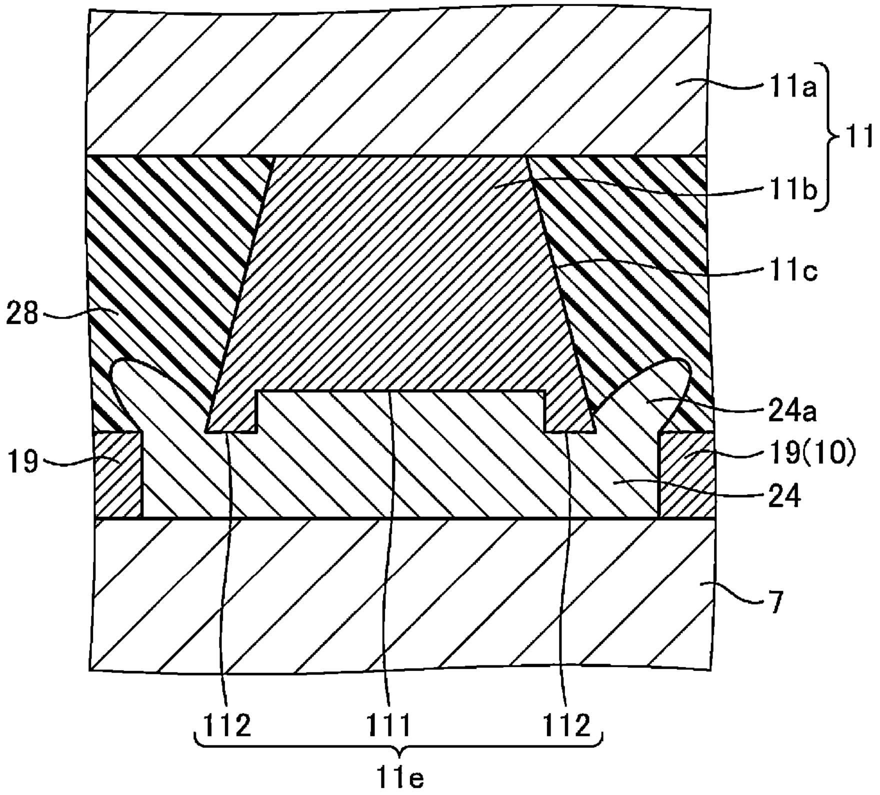
FIG. 8 is a cross-sectional view illustrating the main portion of a thermal head according to a second variation of the embodiment.

FIG. 8 is a cross-sectional view illustrating the main portion of the thermal head according to the second variation of the embodiment. The outer circumferential surface 11*c* may be located such that the terminal portion 11*b* has a cross-sectional area along the end surface 11*e* that becomes smaller as the terminal portion 11*b* becomes away from the substrate 7 as illustrated in FIG. 8. The outer circumferential surface 11*c* of the terminal portion 11*b* is located in this manner, and thus the protruding portion 24*a* of the bonding material 24 is likely to be located away from the terminal portion 11*b*. For this reason, the underfill material 28 enters the gap between the protruding portion 24*a* and the terminal portion 11*b*, and thus the underfill material 28 is less likely to be peeled from the bonding material 24. As a result, the thermal head X1 according to the present variation has improved durability.

Figure 9:
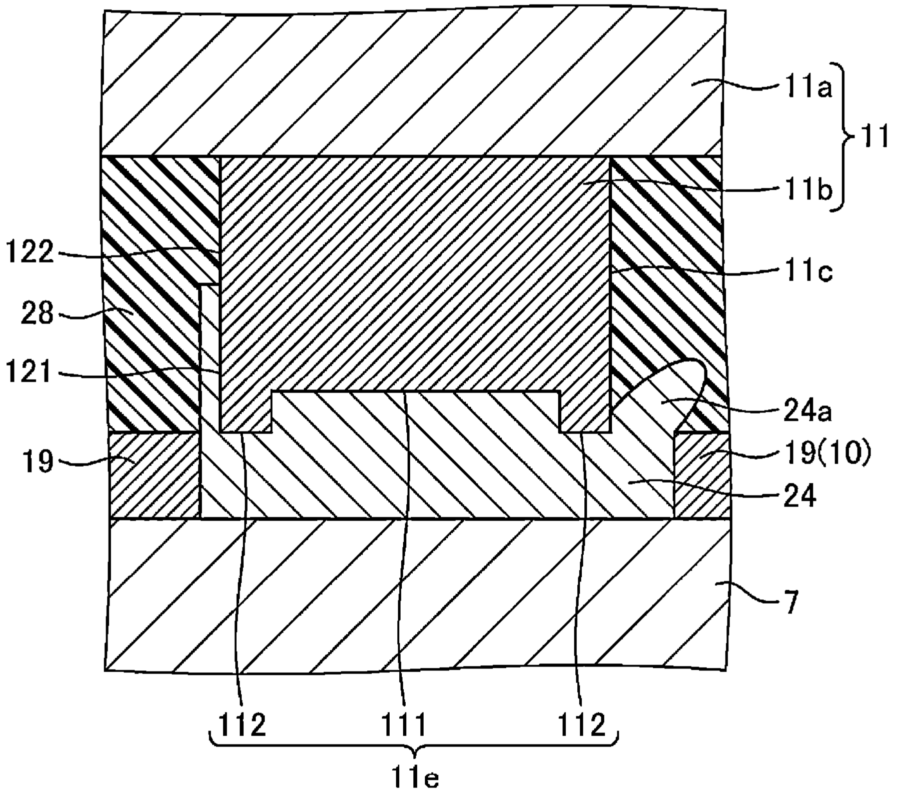
FIG. 9 is a cross-sectional view illustrating the main portion of a thermal head according to a third variation of the embodiment.

FIG. 9 is a cross-sectional view illustrating the main portion of the thermal head according to the third variation of the embodiment. In the above-described embodiment illustrated in FIG. 4, the outer circumferential surface 11*c* is located such that the protruding portion 24*a* of the bonding material 24 surrounds the outer circumferential edge of the terminal portion 11*b*. In contrast, the protruding portion 24*a* may be located at a part of the outer circumferential edge of the terminal portion 11*b* as illustrated in FIG. 9.

The terminal portion 11*b* may include an exposed region 122 in which no bonding material 24 is located on the outer circumferential surface 11*c* in the direction intersecting the end surface 11*e* as illustrated in FIG. 9. Metal atoms, for example, Au atoms, contained in the individual electrode 19 which is electrode may partially diffuse to the bonding material 24 side. When only a covered region 121 in which the bonding material 24 is located is provided, without the exposed region 122 on the outer circumferential surface 11*c*, the diffusion of Au atoms as an example of metal atoms may progress, and thus the individual electrode 19 may be disconnected. In contrast, when the exposed region 122 is provided on the outer circumferential surface 11*c* of the terminal portion 11*b*, diffusion of Au atoms is curbed, and a disconnection of the individual electrode 19 is less likely to occur. As a result, the thermal head X1 according to the present variation has improved durability.

Figure 10A:
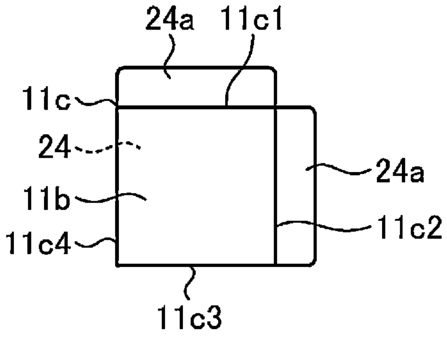
FIG. 10A is a plan view illustrating the main portion of a thermal head according to a fourth variation of the embodiment.

FIG. 10A is a plan view illustrating the main portion of the thermal head according to the fourth variation of the embodiment. The bonding material 24 may include a plurality of protruding portions 24*a* located in different directions in plan view as illustrated in FIG. 10A. Specifically, for example, when the outer circumferential surface 11*c* of the terminal portion 11*b* includes surfaces 11*c*1 to 11*c*4 and has a rectangular shape in plan view, the protruding portion 24*a* may be located on the surfaces 11*c*1 and 11*c*2 side. The plurality of protruding portions 24*a* are provided as described above, peeling of the underfill material 28 from the bonding material 24 is less likely to occur. As a result, the thermal head X1 according to the present variation has further improved durability.

Figure 10B:
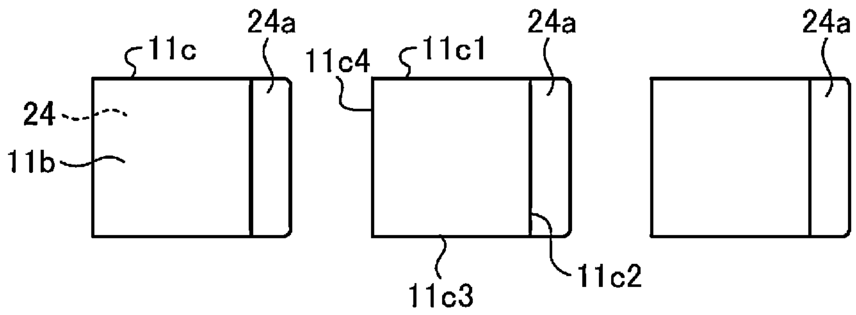
FIG. 10B is a plan view illustrating the main portion of a thermal head according to a fifth variation of the embodiment.

FIG. 10B is a plan view illustrating the main portion of the thermal head according to the fifth variation of the embodiment. When a plurality of terminal portions 11*b* adjacent to each other are provided, the bonding materials 24 of the plurality of terminal portions 11*b* may include protruding portions 24*a* located in the same direction in plan view as illustrated in FIG. 10B. Specifically, for example, when the outer circumferential surface 11*c* of the terminal portion 11*b* includes surfaces 11*c*1 to 11*c*4 and has a rectangular shape in plan view, the protruding portion 24*a* may be located on the surface 11*c*2 side of each terminal portion 11*b*. Due to the protruding portions 24*a* provided in this manner, the protruding portions 24*a* located in the bonding materials 24 adjacent to each other come into contact with each other, and thus a failure such as short-circuiting is reduced. As a result, the thermal head X1 according to the present variation has further improved durability.

Although the embodiments and variations of the present disclosure have been described above, the present disclosure is not limited to the embodiments described above, and various modifications can be made without departing from the spirit thereof. For example, although a planar head in which the heat generating part 9 is located on the main surface of the substrate 7 has been described, an end-surface head in which the heat generating part 9 is located on an end surface of the substrate 7 may be employed.

Although description has been made using a so-called thick film head including the heat generating resistor 15 formed by printing, the present disclosure is not limited to a thick film head. A thin film head including the heat generating resistor 15 formed by sputtering may be used.

A material of the underfill material 28 covering the bonding material 24 and the terminal portion 11*b* may be the same material as the covering member 29 covering the drive ICs 11.

The connector 31 may be electrically connected to the head base 3 directly without providing the FPC 5. In this case, a connector pin (not illustrated) of the connector 31 may be electrically connected to the electrode pad 10.

Although the thermal head X1 including the covering layer 27 is exemplified, the covering layer 27 may not be necessarily provided. In this case, the protective layer 25 may extend to the region in which the covering layer 27 could be provided.

Although the electrode pad 10 is made of the same material as the corresponding individual electrode 19 or first electrode 12 in the description above, the material is not limited thereto, and may be, for example, the same material as the bonding material 24. Alternatively, the electrode pad 10 may not be located.

Further effects and variations can be readily derived by those skilled in the art. Thus, a wide variety of aspects of the present disclosure are not limited to the specific details and representative embodiments represented and described above. Therefore, various changes can be made without departing from the spirit or scope of the general inventive concepts defined by the appended claims and their equivalents.

REFERENCE SIGNS

X1 Thermal head
Z1 Thermal printer
1 Heat dissipation body
3 Head base
7 Substrate
9 Heat generating part
10 Electrode pad
11 Drive IC
12 First electrode
14 Second electrode
15 Heat generating resistor
17 Common electrode
19 Individual electrode
24 Bonding material
24*a* Protruding portion
25 Protective layer
27 Covering layer
28 Underfill material
29 Covering member

The invention claimed is:

1. A thermal head, comprising:
a substrate;
an electrode located on the substrate;
a bonding material located on the substrate or the electrode;
an electrically conductive member located on the bonding material and electrically connected to the electrode via the bonding material; and a sealing material located on the substrate, the sealing material covering the bonding material and the electrically conductive member, wherein the bonding material comprises a protruding portion located at an outer circumferential edge of the electrically conductive member, the protruding portion being away from the substrate and the electrically conductive member, the electrically conductive member comprises:

a first end surface facing the bonding material, and a second end surface located closer to the substrate than the first end surface, and surrounding the first end surface in a plan view, and an end portion of the protruding portion is located farther from the substrate than the first end surface.

2. The thermal head according to claim 1, wherein the sealing material comprises a portion located between the protruding portion and the electrically conductive member.

3. The thermal head according to claim 1, wherein the electrically conductive member has a cross-sectional area along at least one of the first end surface or the second end surface of the electrically conductive member facing the substrate, the cross-sectional area becoming smaller as the electrically conductive member gets closer to the substrate.

4. The thermal head according to claim 1, wherein the electrically conductive member comprises an exposed region in which no bonding material is located on an outer circumferential surface of the electrically conductive member in a direction intersecting at least one of the first end surface or the second end surface facing the substrate.

5. The thermal head according to claim 1, wherein the electrically conductive member includes a plurality of electrically conductive members adjacent to each other, the bonding material includes bonding materials corresponding to the plurality of electrically conductive members, the protruding portion includes protruding portions located in a same direction in a plan view, and the bonding materials include the protruding portions.

6. The thermal head according to claim 1, wherein the protruding portion includes a plurality of protruding portions located in different directions in a plan view, and the bonding material includes the plurality of protruding portions.

7. A thermal printer, comprising:

a thermal head, comprising:

a substrate;

an electrode located on the substrate;

a bonding material located on the substrate or the electrode;

an electrically conductive member located on the bonding material and electrically connected to the electrode via the bonding material; and a sealing material located on the substrate, the sealing material covering the bonding material and the electrically conductive member, wherein the bonding material comprises a protruding portion located at an outer circumferential edge of the electrically conductive member, the protruding portion being away from the substrate and the electrically conductive member, the electrically conductive member comprises:

a first end surface facing the bonding material, and a second end surface located closer to the substrate than the first end surface, and surrounding the first end surface in a plan view, and an end portion of the protruding portion is located farther from the substrate than the first end surface;

a transport mechanism transporting a recording medium onto a heat generating part located on the substrate; and a platen roller pressing the recording medium onto the heat generating part.

* * * * *